United States Patent [19]

Chen

[11] Patent Number: 4,792,667
[45] Date of Patent: Dec. 20, 1988

[54] METHOD AND APPARATUS FOR AUTHENTICATING DOCUMENTS UTILIZING POLED POLYMERIC MATERIAL

[75] Inventor: Daniel Y-J. Chen, Springfield, Va.

[73] Assignee: SICPA Holding, S.A., Glarus, Switzerland

[21] Appl. No.: 31,995

[22] Filed: Mar. 27, 1987

[51] Int. Cl.[4] .................................................. G06K 19/00
[52] U.S. Cl. ..................................... 235/488; 235/441; 235/492; 283/72
[58] Field of Search ............... 235/435, 441, 487, 488, 235/492; 283/72, 90, 94

[56] References Cited

U.S. PATENT DOCUMENTS

| | | | |
|---|---|---|---|
| 4,098,940 | 7/1978 | Groh et al. | 283/90 |
| 4,350,883 | 9/1982 | Lagarde | 235/492 |
| 4,544,836 | 10/1985 | Galvin et al. | 283/90 |
| 4,650,979 | 3/1987 | Stockburger et al. | 235/493 |
| 4,659,112 | 4/1987 | Reiner et al. | 283/90 |

Primary Examiner—A. D. Pellinen
Assistant Examiner—Jeffrey A. Gaffin
Attorney, Agent, or Firm—Lieberman Rudolph & Nowak

[57] ABSTRACT

A method and apparatus for authenticating documents, utilizing the ferroelectric properties of poled polymeric materials. The properties displayed by the poled materials are detected in order to authenticate the documents to which they are affixed. The poled polymeric material can be used as a protective coating or covering for an indentifying photograph and/or signature and can be applied to a document in such a fashion that heat is needed to remove it. The ferroelectric properties of the poled polymeric material virtually disappear when the material is subjected to critical temperatures, such as those necessary to remove the material from the document. The absence of these properties therefore, signifies that the document has been tampered with.

12 Claims, 4 Drawing Sheets

METHOD AND APPARATUS FOR AUTHENTICATING DOCUMENTS UTILIZING POLED POLYMERIC MATERIAL

FIELD OF THE INVENTION

The present invention relates to a method whereby documents such as identification cards, passports, credit cards and other security materials can be easily and inexpensively verified as authentic.

The invention takes advantage of the pyroelectric and peizoelectric characteristics of polarized polymers, and the fact that such characteristics virtually disappear or are substantially altered when the polymeric material reverts to a non-polarized form. It is the nature of polarized polymeric materials that this reversion occurs upon exposure to critical temperatures.

DESCRIPTION OF THE PRIOR ART

The necessity to authenticate documents and prevent against their falsification has inspired varied solutions. Several involve altering the a surface of a document, or part thereof, to react in a unique manner to magnetic or optical exposure. The following are examples of broad and diverse teachings.

U.S. Pat. No. 3,873,813 to Lahr et. al. which describes a specially treated credit card coated with a substance which permanently and irreversibly changes from a first reflective state to a second reflective state having different characteristics from the first. Authenticity of the credit card is confirmed by measuring differences in reflectivity, the amplitude of which denotes authenticity. The change in reflectivity occurs when the substance is heated.

U.S. Pat. No. 4,250,393 to Greenaway describes a photoelectric apparatus for detecting altered markings on a document. These documents contain information in the form of optical markings, which deflect a reading beam coming from a light source in at least one given direction of deflection. A comparator compares the electrical signals between a first and second light sensor, thereby distinguishing altered markings from unaltered markings.

U.S. Pat. No. 4,098,940 to Groh et. al. describes the use of a sheet made of transparent thermoplastic with optical inhomogeneties according to a desirable and reproducible pattern. This pattern is not discernable with an unaided eye and it produces polarization-optical patterns when placed in a polarization-optical arrangement. Groh teaches the use of this material to manufacture "counterfeit proof" official documents. The polarization disclosed in Groh involves a polarization with respect to light waves and not electrical polarization, which is characteristic of the present invention.

All of the above methods involve complex and expensive processes and apparatus to detect altered or unofficial documents.

The present invention on the otherhand utilizes the pyroelectric or piezoelectric characteristics of polarized polymeric materials for authentication and identification, and at the same time utilizes their inherent protective characteristics as a laminate, coating or covering for the document. In addition, the nature of the authentication method is not apparent to the user and only becomes apparent when the document is presented for authentication in accordance with the method described herein.

In 1977, a patent issued to Allen Taylor, (U.S. Pat. No. 4,035,164), disclosed a method for removing charged and noncharged particles from a fluid by employing a pyroelectric filter comprised of poled polymeric material. The disclosures of Taylor included a discussion of various methods used to polarize these materials all of which involve creating an electric moment aligned along a direction of an electric field applied to a portion of the material. These disclosures shall be incorporated herein by reference.

In an article entitled "Ferroelectric Polymers and Their Applications" by Michael A. Marcus, published in *Ferroelectrics*, volume 40, pages 29–41 (1982), the use of polymeric materials as transducers is detailed. Basically, electrical currents will be generated when polarized polymeric material, such as polyvinylidene flouride ($PVF_2$) material, is exposed to thermal or mechanical stimulation.

Once a piece of polymeric material is polarized, it remains polarized until it is physically affected in some manner to cause subsequent nonpolarization. Nonpolarization will for example occur if the temperature of the polymeric material is raised to a critical temperature. This temperature is known as the Curie temperature. As described by Andrew J. Lovinger in his article, "Curie Transitions In Copolymers Of Vinyldene Flouride", which appeared in *Ferroelectrics*, Vol. 50, pp. 227–236 (1983), the Curie temperature differs for different compositions of the material.

In fabricating the protected document described herein, the softening or melting point temperature of the adhesive used to attach the polymeric material to the document can be made to correspond to the Curie temperature of the polymeric material so that nonpolarization occurs if the adhesive, and therefore the polymeric material, are heated to this temperature.

It is, therefore, an object of the instant invention to provide a method for authenticating documents thus affirming the identification of the holder.

It is further object of the invention to provide such a method which is uncomplicated and relatively inexpensive and easy to implement.

It is a still further object to incorporate such a method in a manner which is virtually undetectable by the bearer.

It is a still further object to incorporate such a method in a system of protecting the document from physical abuse.

It is yet a further object to provide a self authenticating document which will lose its authenticating properties upon being subjected heat at or above a critical temperature.

SUMMARY OF THE INVENTION

In the method described herein, pre-poled films of polymeric material made from polyvinylidene flouride resin (PVDF), vinylidene/trifluorethylene copolymer resin (VDF/TrVE) and, vinylidene/tetrafluoroethylene copolymer resin (VDF/TFE), are affixed to the surface of the document substrate with adhesive.

Polymeric material can also be applied to the document as a coating which is painted, printed or otherwise applied to the surface of the substrate. The coating which is a mixture of polymeric material and an appropriate coating vehicle is first applied to the document substrate. After it is so applied, it is polarized. Methods for polarizing polymeric materials are known in the art as for example taught by Taylor supra.

When the polymeric material is polarized, the dipoles of the polymer molecules, are oriented along an induced electric field. The material remains poled until it is subjected to a depolarizing force or energy, such as exposure to critical temperatures. Authentication takes place by inserting the document into a device which is comprised of two electrodes applied to the obverse and reverse sides of the document sandwich. One electrode is grounded and both electrodes are connected in series with a current indicating apparatus. The imbalance of charge distribution due to external stimulation causes an electrical current to be generated.

In a first embodiment, a document comprising the document substrate and the covering, coating or laminate of polymeric material, is placed between two electrodes, which are maintained within a temperature controlled chamber. The sandwich is then subjected to a specific increment of temperature change, by altering the temperature in the chamber. The resulting electrical current which flows between the electrodes depends on the rate of change of temperature, represented by the formula: $I = P_y A(dT/dt)$, where I is current, A is the area of the portion of the sandwich tested, dT/dt is the rate of change of the temperature (T) with respect to time (t), and $P_y$ is the pyroelectric coefficient of the poled sample. This formula is well known in the prior art (see e.g. "Pyroelectricity and Charge Transport In a Copolymer of Vinylidene Fluoride and Tetrafluoroethylene", *Polymer*, vol. 23, pp. 22–23, January, 1983). The current is amplified and detected by current detecting apparatus which can include a suitable indicator such as a meter, or an indicating light, etc.

If a document prior to being inserted in the authenticating apparatus is depolarized through alteration by heat exceeding the Curie temperature of the material, the level of current flow resulting from the applied heat change, will be insufficient to indicate an authentic document.

In a second embodiment, taking advantage of the piezoelectric nature of the polarized polymeric material, the reverse side of the document is placed in contact with one electrode while obverse side of the document, generally the side with the polymeric covering, is subjected to a physical impact by a second electrode. This impact causes a current to be generated between the electrodes which is detected in the same manner as described in the first embodiment. The impact is controlled so that it can be carefully predicted and yet not damage the document.

If the polymeric material is depolarized, substantially no current will be generated upon application of the stimulus. As described above, such depolarization will occur if the document is subjected to the application of heat in excess of the Curie temperature of the material, as will happen if the material is subjected to removal by melting or softening of the adhesive during an attempt to alter the document.

The method described herein signals the presence of an document which has been subjected to heat indicative of an attempt to alter the document, by indicating a lack of polarization which is in turn indicated by the substantial absence of current flow upon the application of the stimulus. By polarizing the material to specific tolerances and by maintaining critical control over detection means, different currents can be distinguished relative to the nature of the polarization of specific materials. This enables various "channels" of authorization to be used for a particular company or group of companies seeking to authenticate various documents at different security levels.

When the polymeric material is polarized, the moment of electric charge assumes the polarity of the polarizing field. The polymeric material can thus be poled so as to have not only a characteristic level of charge but also either a negative or positive one.

The polymeric material can be poled with different characteristics in different portions of the same surface, thus a pattern of distinctively poled areas can be created, and detected to insure authenticity.

It is, therefore, a feature of the present invention to provide the means for authenticating documents using polymeric materials, which have been polarized.

It is further feature for the present invention that polarization of the polymeric material can be detected simply and easily through the piezoelectric or pyroelectric characteristics of polymeric materials.

It is still further feature of the present invention that insufficient levels of current flow when the document is exposed to either thermal or mechanical manipulation indicates that the documents have been altered or are not authentic.

It is yet a further feature that the adhesive use to attach the polymeric sheet will have a softening or melting temperature at least as high as the Curie temperature of the polymeric material.

It is a still further feature that the authentication can be achieved inexpensively and with uncomplicated equipment.

It is a further feature that the polymeric material can be polarized with precision so that particular levels of current flow with specific polarities will be generated when subjected to physical stimulation.

It is a further feature that the polymeric material can be poled in distinctive patterns.

These and other objects and features of the present invention will become more apparent when taken in conjunction with the following description and drawings wherein like characters indicate like parts, in which drawings form a part of the present specification.

DETAILED DESCRIPTION OF THE INVENTION

Figure 1:
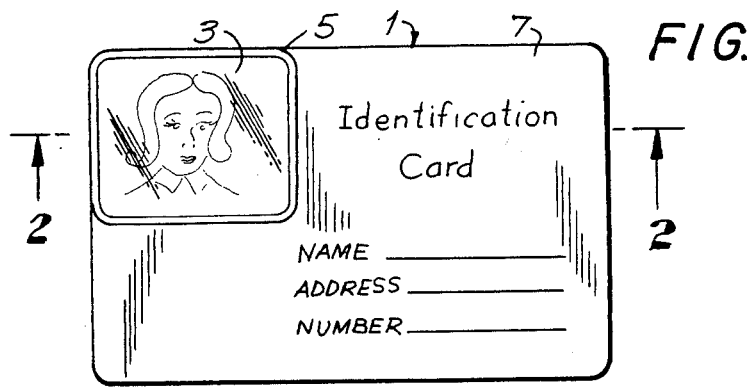
FIG. 1 is a top view of the upper surface of an identification document, which has been treated with a laminate, covering or coating of transparent polymeric material.

FIG. 1 illustrates a identification document 1. On a first surface of the document 1 (also defined herein as the "obverse" side), photograph 3 is affixed which has been covered by an application of transparent polymeric material 5 either as a prepoled film or an applied coating in the form of a paint, or ink, which is poled after application. Although not indicated in this figure, the entire surface of the document can be covered by the polymeric material. Also, the coating, covering or laminate need not be transparent and could be opaque and limited to a partial area of the document.

Figure 2:
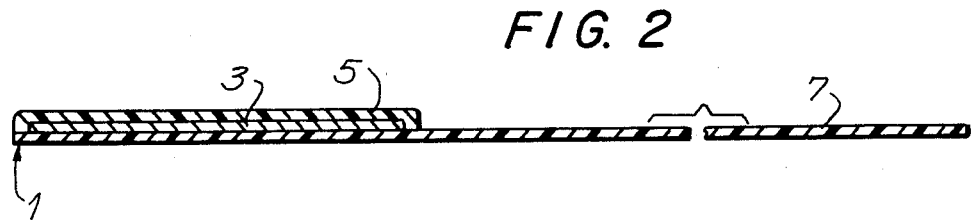
FIG. 2 is an sectional view of the card of FIG. 1.

The document 1 thus resembles a "sandwich", as shown in FIG. 2, comprised of the polymeric material 5, the photograph 3 and the document substrate 7. The polymeric material 5 has been polarized and accordingly document 1 has a static electrical charge as measured from upper exposed surface of the polymeric material 5 to the bottom surface of the substrate 7.

Figure 3:
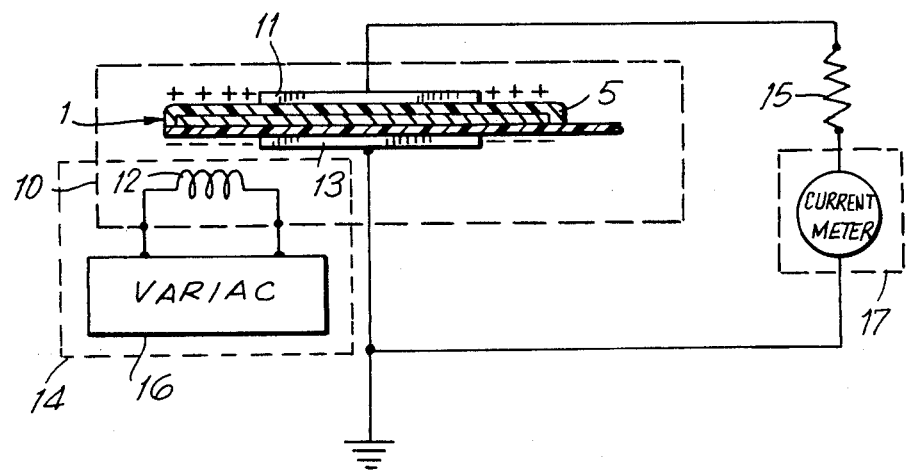
FIG. 3 is a schematic diagram of a first apparatus comprising a first embodiment of the present invention.

FIG. 3 is a schematic diagram of an apparatus which can be used to detect authenticity of a document by taking advantage of the pyroelectric characterictic of the poled material 5. To check authenticity, laminated, covered or coated document 1 is positioned between electrodes 11 and 13 inside the temperature controlled chassis 10. When the temperature of the chassis is changed at a controlled interval at a specific rate of change, a predictable amount of current will flow between the electrodes 11 and 13, through resistor 15 and indicating means 17, which in FIG. 3 is a picoammeter. The temperature inside the chassis 10 is controlled by heat control means 14, comprising a heating element 12 connected to a variable power supply such as a Variac 16. If upon stimulation the indicator 17 registers a predicted current flow, the validity of a particular document is verified.

The amount of current flow and its polarity can be predicted by carefully controlling the conditions under which the polymeric material is polarized and under which it is stimulated during authentication.

A document which has been depolarized will fail to generate the predicted current flow. Depolarization results from the application of heat at, or in excess of the Curie temperature of a polymeric material of a specific composition. Application of heat at such a level would be necessary in order to remove the polymeric material 5 prior to altering the document.

Once the polymeric material has been exposed to the critical temperature at which depolarization occurs, any attempt to replace the material 5 on the substrate 7 will still result in an indication of tampering or alteration of the document, even if the physical appearance of the document shows no sign of alteration.

Figure 4:
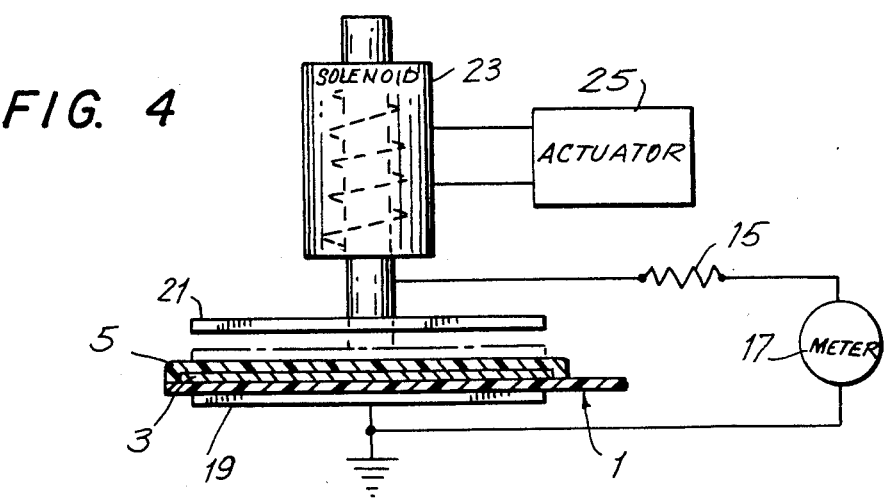
FIG. 4 is a schematic diagram of a second apparatus comprising a second embodiment of the present invention.

FIG. 4 is a schematic diagram of an apparatus which can be used to detect authenticity of a document by taking advantage of the piezoelectric charaterictic of the poled material 5. The document 1 comprising polarized polymeric material 5 is placed in contact with one electrode 19. A second electrode 21 is calibrated by solenoid 23. When the solenoid 23 is activated by a pushbutton or activator 25, solenoid 23 causes attached electrode 21 to impact upon polymeric material 5 (as shown in broken lines). This impact is precisely controlled and the piezoelectric reaction causes a predictable amount of current to flow between electrodes 19 and 21 through resistor 15 and indicator 17 as described above. If the polymeric material 5 has been depolarized through tampering, the impact of electrode 21 will not cause the predictable level of current to flow and the document will be rejected as not being authentic.

As previously described, the current flow can be predicted by the ferroelectric characteristics of the polymeric material and the manner in which it is polarized. In the embodiments described thus far, the indicators 17 are set to detect a predictable level of current flow having a specific polarity, when the material 5 is subjected to controlled level of stimulation for a specific length of time. By altering either the composition of the material, the nature of the polarization procedure or the degree of stimulation applied to the material 5, the level of current flow can be predicted. It is possible therefore, to establish different levels of authentication for different documents, as determined by the detection of different levels of current flow having different polarities, for a given degree of stimulation.

Figure 5:
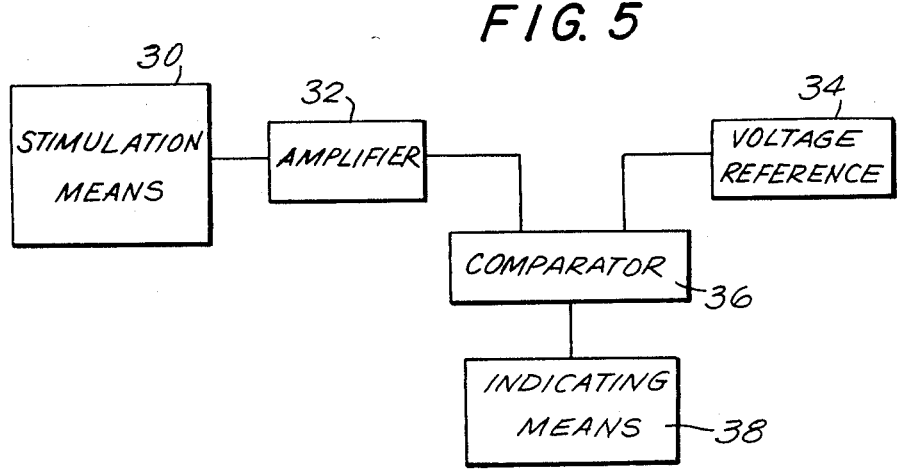
FIG. 5 is a block diagram of additional circuitry designed to be used with the apparatus shown in FIGS. 3 and 4.

FIG. 5 describes in block diagram form, additional circuitry which can be used with either the thermal or mechanical stimulation devices shown in FIGS. 3 and 4. The current generated by the stimulation means 30 is converted to a voltage and amplified by voltage amplifier 32. Voltage reference 34 supplies a reference voltage which substantially equals the predicted voltage resulting from the stimulation of an authentic document, as described hereinabove. The voltages from amplifier 32 and from voltage reference 34 are fed to comparator 36. If these outputs are substantially equal, indicator 38 will indicate a valid document.

Figure 6:
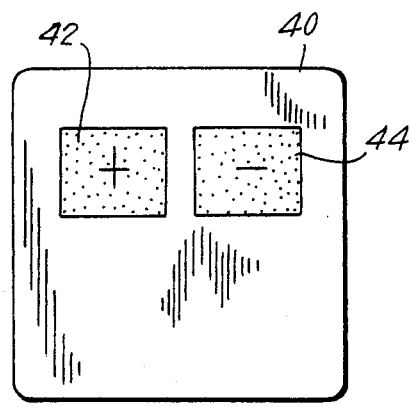
FIG. 6 is a piece of polymeric material which is selectively poled on different portions of its surface.

FIG. 6 is a top view of a document comprising a polymeric material 40 which has been polarized only on two portions of its area, forming a pattern. By controlling the application of the polarizing field, a pattern of poled areas can be formed, with the remaining areas being substantially non-poled. Area 42 is shown having a specific poled characteristic comprising a positive polarity. Area 44 is shown having a specific poled characteristic comprising a negative polarity. Under controlled stimulation, these areas will display different characteristics with respect to the level and polarity of current generated. The pattern is undetectable visually and a complicated pattern increases the degree of security provided.

Figure 7:
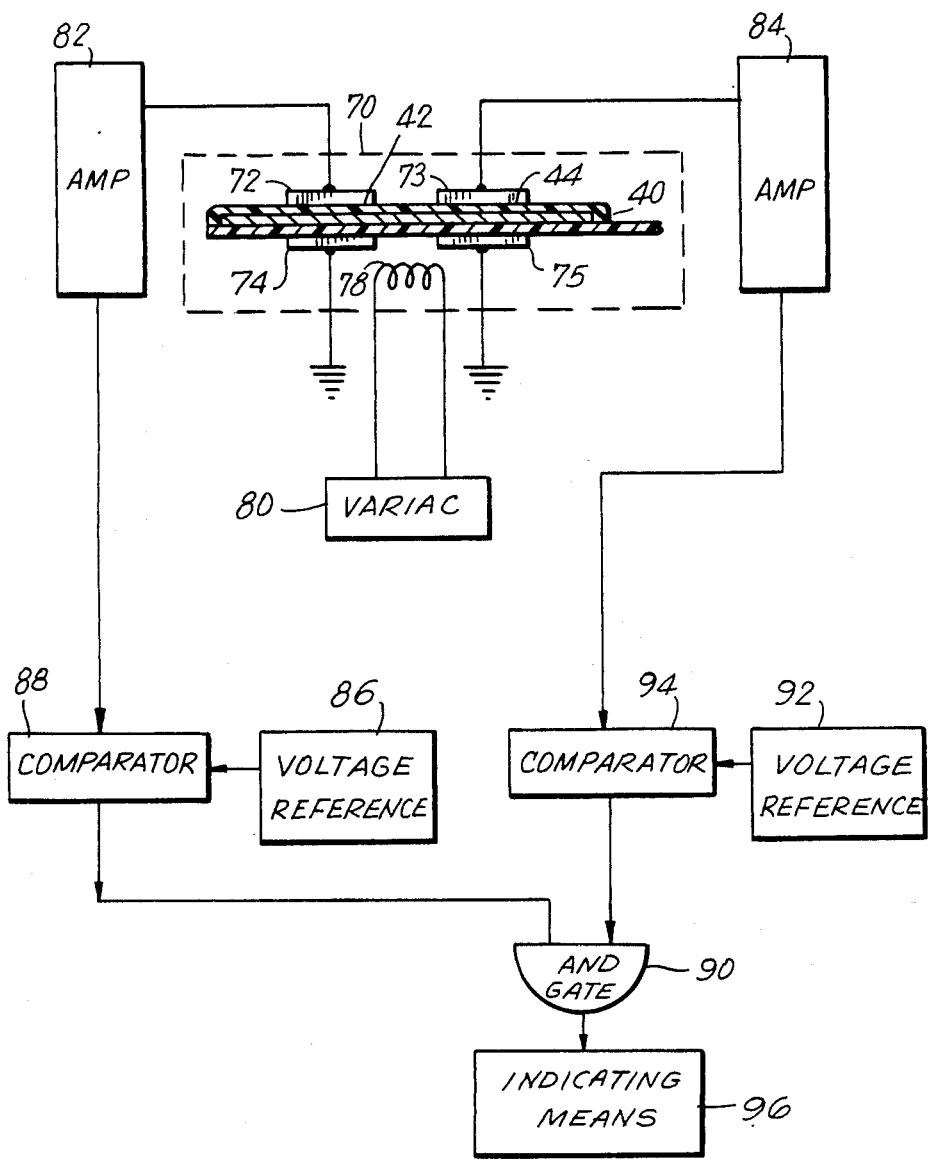
FIG. 7 is a schematic diagram of an apparatus for detecting a pattern of poled portions of a single piece of polymeric material.

FIG. 7 schematically describes an apparatus for detecting different combinations of predicted current characteristics, when the document being checked comprises a polymeric material which has been selectively poled in a pattern as described in FIG. 6. The temperature controlled detection chassis 70 comprises a set of electrodes which positionally correspond to poled areas 42 and 44 of document 40 and heating element 78. The two areas, 42 and 44, are shown in contact with electrodes 72 and 73, and 74 and 75 respectively. Temperature control is provided by Variac 80 which controls the power delivered to heating element 78. As a result of the change in temperature, current flows from electrode 72 to amplifier 82, and from electrode 74 to amplifier 84. Electrodes 73 and 75 are both grounded. The respective currents are converted to voltages and amplified by respective amplifiers 82 and 84. Voltage reference 86 supplies a reference voltage which substantially equals the predicted voltage resulting from the stimulation of poled area 42, as described hereinabove. A substantial equality between the reference voltage and the voltage from amplifier 82 will be detected by comparator 88 and a logical HIGH will be output to one input of AND gate 90. Similarly, voltage reference 92 supplies a reference voltage which substantially equals the predicted voltage resulting from the stimulation of poled area 44 as described hereinabove. A substantial equality between the reference voltage and the voltage from amplifier 84 will be detected by comparator 94 and a logical HIGH will be output to one input of ANd gate 90. Only when both inputs to AND gate 90 are HIGH, will indicating means 96 indicate an authentic document.

The apparatus of FIG. 7 can also be designed utilizing solenoid controlled, impact type electrodes as in FIG.4.

If the designed pattern includes more than two poled areas, then electrodes, an amplifier, comparator and voltage reference must be provided for each area.

Figure 8:
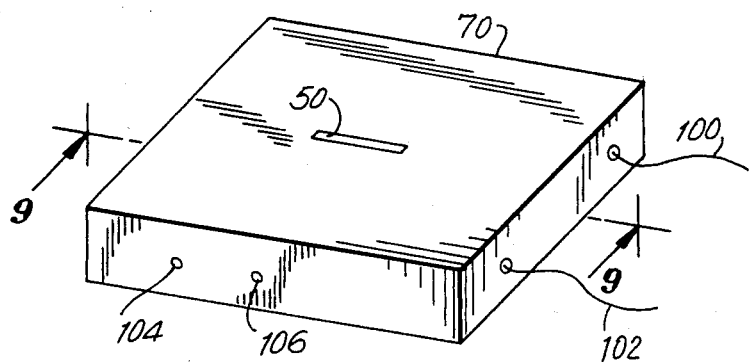
FIG. 8 is an isometric view of the outside of a detection apparatus.
Figure 9:
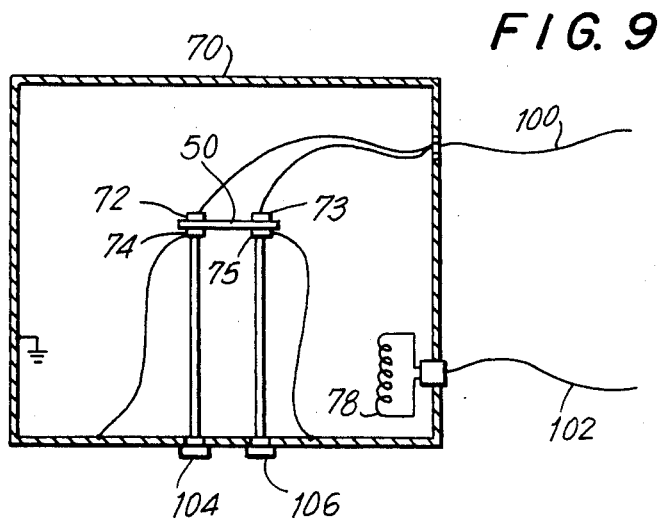
FIG. 9 is a top sectional view of the apparatus of FIG. 8.

The temperature controlled detection chassis 70 can be constructed having a slot or opening for insertion of the document to be authenticated. The electrodes would be placed internally in the chassis, on either side of the slot or opening, so as to contact both sides of the document "sandwich". FIG. 8 describes the exterior of such an chassis 70 isometrically. FIG. 9 is a sectional view of chassis 70 showing slot 50, electrodes 72, 73, 74, 75, cable 100 connecting the electrodes to the amplification and indication circuitry (not shown), heating element 78 and cable 102 which is connected to a Variac (not shown). The distances between electrodes 72 and 74 and between electrodes 73 and 75, are controlled by threaded adjustment shafts 104 and 106. The distance between the electrodes directly effects the pressure of the electrodes upon the document when inserted.

As known in the art, the functions of the voltage references, comparators, and heating control can be carried out using a programmable microprocessor or computer having various voltage levels stored digitally in its memory along with polarity information.

While the invention has been particularly shown and described with reference to preferred embodiments thereof, it will be understood by those skilled in the art that the foregoing and other changes in form and details may be therein without departing from the spirit and scope of the invention.

I claim:

1. A method for authenticating documents utilizing the ferroelectric properties exhibited by polymeric materials, comprising the steps of:
   (a) affixing a poled polymeric material to a first surface of a document substrate, thereby forming a document sandwich with obverse and reverse sides;
   (b) physically stimulating said polymeric material;
   (c) detecting a level of current flow between said obverse and reverse sides of said document sandwich, said level of current flow and its polarity is indicative of the polarized sate of the polymeric material;
   (d) electrically comparing said current flow to a fixed reference;
   (e) activating an indicating device if said current flow substantially equals said fixed reference.

2. The method described in claim 1 wherein step (a) comprises the further step of using an adhesive to affix said polymeric material to said document substrate, said adhesive having a softening temperature which is substantially equal to, but not less than, the Curie temperature of the polymeric material.

3. The method described in claim 1 wherein the physical stimulation is thermal.

4. The method described in claim 1 wherein the physical stimulation is controlled physical impact.

5. The method described in claim 1 wherein the poled polymeric material is poled in a pattern comprising two or more discrete areas of the total surface area of the polymeric material.

6. The method described in claim 5 wherein each of said discrete areas exhibits different ferroelectric characteristics when subjected to said stimulation.

7. A method for authenticating documents utilizing the ferroelectric properties exhibited by polymeric materials, comprising the steps of:
   (a) affixing a polymeric material to a first surface of a document substrate, thereby forming a document sandwich with obverse and reverse sides;
   (b) polarizing at least one discrete area of said polymeric material;
   (c) physically stimulating said polymeric material and in response thereto detecting a level of current flow between said obverse and reverse sides of said document sandwich, said level of current flow and its polarity indicative of the polarized state of the polymeric material;
   (d) electrically comparing said current flow to a fixed reference;
   (e) activating an indicating device if said current flow substantially equals said fixed reference.

8. The method described in claim 7 wherein the physical stimulation is thermal.

9. The method described in claim 7 wherein the physical stimulation is controlled physical impact.

10. The method described in claim 7 wherein the poled polymeric material is poled in a pattern comprising two or more discrete areas of the total surface area of the polymeric material.

11. The method described in claim 10 wherein each of said discrete areas exhibits different ferroelectric characteristics when subjected to said stimulation.

12. An apparatus to be used as a means for authenticating a document said document having affixed thereto polarized polymeric material said apparatus comprising:
   (a) a substantially sealed chassis;
   (b) an opening placed on one side of said chassis wherein a portion of said document to which said polarized polymeric material is affixed, can be inserted;
   (c) at least one pair of electrodes, each electrode of each pair being positioned on opposite sides and proximate to said opening in order to contact said polarized polymeric material affixed to said document;
   (d) a means for physically stimulating said polarized polymeric material affixed to said document thereby causing current to flow between each of said ones of pairs of electrodes and;
   (e) indication means for detecting said current flow.

* * * * *